J. GOETZ.
CUTTER COUPLING FOR MILLING MACHINES.
APPLICATION FILED MAR. 13, 1914.
1,104,044.
Patented July 21, 1914.
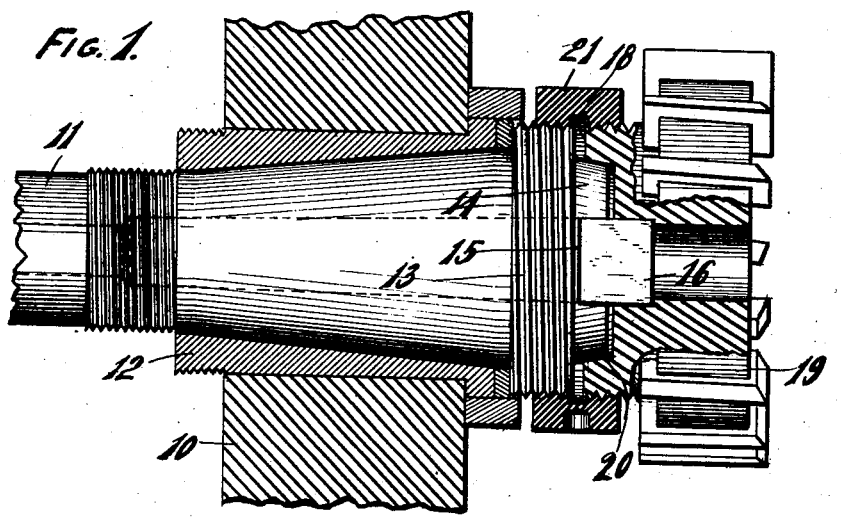
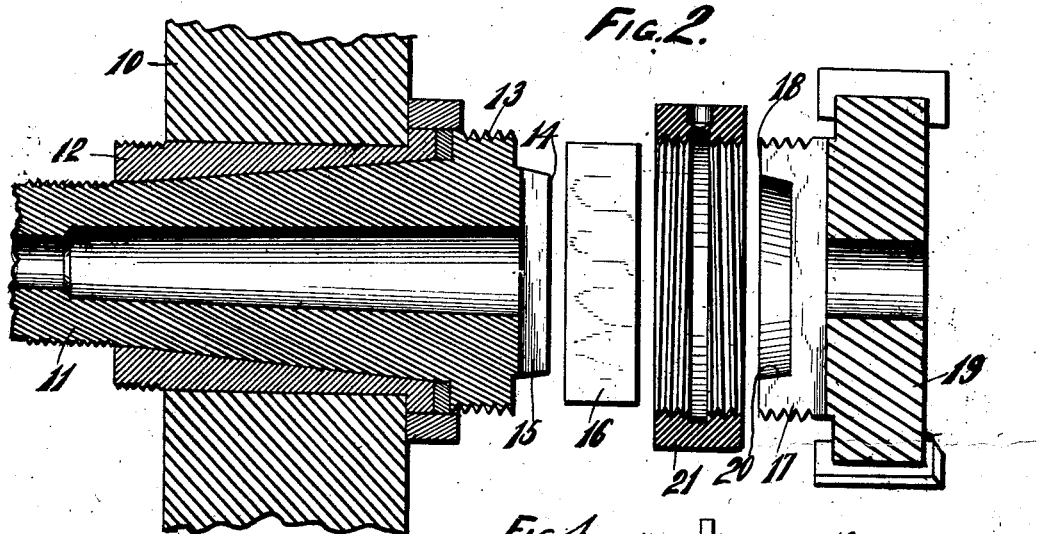
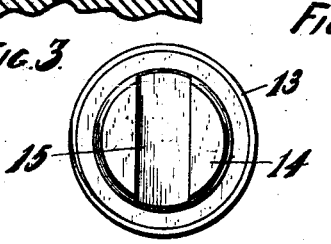
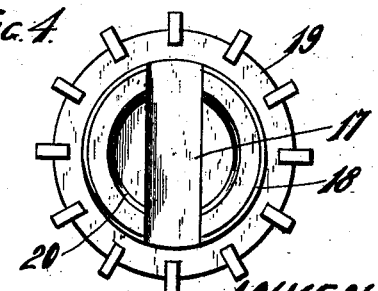
WITNESSES.
INVENTOR.
John Goetz
By Morsell & Caldwell
ATTORNEYS

UNITED STATES PATENT OFFICE.

JOHN GOETZ, OF WEST ALLIS, WISCONSIN, ASSIGNOR TO THE KEMPSMITH MANUFACTURING CO., OF MILWAUKEE, WISCONSIN, A CORPORATION OF WISCONSIN.

CUTTER-COUPLING FOR MILLING-MACHINES.

1,104,044.   Specification of Letters Patent.   Patented July 21, 1914.

Application filed March 13, 1914. Serial No. 824,368.

*To all whom it may concern:*

Be it known that I, JOHN GOETZ, a citizen of the United States, and resident of West Allis, in the county of Milwaukee and State of Wisconsin, have invented new and useful Improvements in Cutter-Couplings for Milling-Machines, of which the following is a description, reference being had to the accompanying drawings, which are a part of this specification.

This invention relates to cutter couplings for milling machines and has for its object to provide a coupling which may be quickly connected or disconnected and which will accurately center the cutter with relation to the spindle.

With the above and other objects in view the invention consists in the cutter coupling for milling machines as herein claimed and all equivalents.

Referring to the accompanying drawings in which like characters of reference indicate the same parts in different views: Figure 1 is a sectional elevation of a cutter coupling for milling machines constructed in accordance with this invention; Fig. 2 is a sectional view thereof with the parts disconnected, the sectional plane thereof being at right angles to the sectional plane of Fig. 1; and, Figs. 3 and 4 are end views of the spindle and cutter head respectively.

In these drawings 10 indicates a milling machine frame having the spindle 11 journaled therein through a bushing 12 as usual. The enlarged end of the spindle forms a threaded head 13 having a conical boss or projection 14 on the end face thereof concentric with the spindle. The conical projection 14 has a slot 15 extending diametrically through it to receive a key 16 approximately square in cross section which closely fits therein for about one-half its thickness. The part of the key projecting from the head of the spindle fits within a slot 17 extending diametrically through a threaded concentric connecting boss 18 on a cutter head 19, while the conical projection 14 fits within a correspondingly shaped recess 20 of the connecting boss 18. The screw threads of the head 13 and the connecting boss 18 of the cutter head are different, that is, one is a right hand thread and the other a left hand thread. A nut 21 provided with right and left internal screw threads fits upon the head and the connecting boss 18 with its threads turning into the threads thereof so that when the nut is turned in one direction the parts are drawn together and when turned in the other direction they are forced apart.

The conical fit between the projection 14 of the spindle and the conical recess of the connecting boss of the cutter head assure an accurate alinement of the axis of the cutter head and the axis of the spindle, while the presence of the key 16 fitting in the slots 15 and 17 compels the cutter head to turn with the spindle.

The nut may be threaded onto one member to a greater extent than on the other, so as to remain connected therewith when the cutter head is disconnected, but when turned to connect the parts it serves to tightly clamp them together in their keyed engagement and in true alinement.

What I claim as new and desire to secure by Letters Patent is:

1. A cutter coupling for milling machines and the like, comprising the combination with a spindle having a threaded end with a slotted end face and a cutter head having a threaded boss with a slotted end face of a key fitting within the slots in the end of the spindle and the boss, and a nut threaded on the spindle and the boss to draw them together.

2. A cutter coupling for milling machines and the like, comprising a spindle having a threaded head and a conical projection at the end face thereof with a slot therethrough, a cutter head having a threaded connecting boss with a conical recess therein to receive and fit upon the conical projection of the spindle and having a slot in its end, a key fitting within the slots of the spindle and the connecting boss, and a nut having right and left hand threads fitting on the head of the spindle and on the connecting boss of the cutter head respectively to draw the parts together or force them apart.

In testimony whereof, I affix my signature, in presence of two witnesses.

JOHN GOETZ.

Witnesses:
 R. S. C. CALDWELL,
 KATHERINE HOLT.